United States Patent
Ide et al.

(10) Patent No.: US 10,378,997 B2
(45) Date of Patent: Aug. 13, 2019

(54) CHANGE DETECTION USING DIRECTIONAL STATISTICS

(71) Applicant: International Business Machines Corporation, Armonk, NY (US)

(72) Inventors: Tsuyoshi Ide, Harrison, NY (US); Jayant R. Kalagnanam, Briarcliff Manor, NY (US); Dung T. Phan, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 162 days.

(21) Appl. No.: 15/490,282

(22) Filed: Apr. 18, 2017

(65) Prior Publication Data
US 2017/0322114 A1    Nov. 9, 2017

Related U.S. Application Data

(60) Provisional application No. 62/332,725, filed on May 6, 2016.

(51) Int. Cl.
*G06F 11/30* (2006.01)
*G01M 13/00* (2019.01)

(52) U.S. Cl.
CPC .................................. *G01M 13/00* (2013.01)

(58) Field of Classification Search
CPC .................................................. G01M 13/00
See application file for complete search history.

(56) References Cited

U.S. PATENT DOCUMENTS

| | | | |
|---|---|---|---|
| 7,456,603 B2 | 11/2008 | Kanekawa | |
| 2010/0141508 A1 | 6/2010 | Nguyen | |
| 2013/0003802 A1* | 1/2013 | Doron | H04B 17/345 |
| | | | 375/224 |
| 2014/0070983 A1 | 3/2014 | Maalouli | |
| 2014/0203867 A1 | 7/2014 | Onsori | |
| 2016/0027451 A1 | 1/2016 | Solbach | |
| 2016/0033639 A1* | 2/2016 | Jung | G01S 13/9023 |
| | | | 342/25 C |

OTHER PUBLICATIONS

Boulanger, Jeremie, et al., "Filtering from observations on Stiefel manifolds", Signal Processing 122 (May 2016): pp. 52-64.
Said, Salem, et al.; "On filtering with observation in a manifold: Reduction to a classical filtering problem", SIAM Journal on Control and Optimization 51.1 (Feb. 2013):pp. 767-783.

* cited by examiner

*Primary Examiner* — Phuong Huynh
(74) *Attorney, Agent, or Firm* — Daniel P. Morris, Esq.; Hoffmann & Baron, LLP

(57) ABSTRACT

A method includes capturing multivariate time-series data comprising two or more data sets from a system captured over a past time period and a present time period, applying at least two sliding time windows to the multivariate time-series data in determining respective data matrices, computing an orthonormal matrix for each of the data matrices, wherein the orthonormal matrix is a signature of fluctuation patterns of a respective data matrix, computing a difference between at least two of the data sets in the past and the present time periods through the orthonormal matrices, and detecting a fault in at least one of the systems by comparing the difference to a threshold.

16 Claims, 7 Drawing Sheets

CHANGE DETECTION USING DIRECTIONAL STATISTICS

CROSS-REFERENCE TO RELATED APPLICATIONS

This application claims the benefit of U.S. Provisional Patent Application No. 62/332,725 filed on May 6, 2016, the complete disclosure of which is expressly incorporated by reference herein in its entirety for all purposes.

BACKGROUND

The present disclosure relates to change detection from noisy multivariate time-series data.

The task of change detection has a long history in statistics. The standard strategy is to use a parametric model for probability density and compute the likelihood ratio to quantify the degree of change between fitted distributions. FIG. 1 shows a typical setting, where the task is to compute a degree of change, or the change score, of the data within the test window taken at time t in comparison to the training window.

When applying a change detection method to real-world problems, interpretability and robustness to nuisance noise variables are important considerations. To validate detected changes with domain knowledge, it is almost always required to explicitly present statistics (or feature) for the parametric model, such as the mean for Gaussian. Although it is possible to design an algorithm that skips the explicit step of feature extraction and jumps directly into score calculation, such an approach suffers from a lack of interpretability. In the multivariate setting, the robustness to noise variables is also important, since changes may not always occur in all of the variables simultaneously. Under the existence of nuisance noise variables, the performance of direct density-ratio estimation approaches is known to significantly degrade.

BRIEF SUMMARY

According to an exemplary embodiment of the present invention, a method includes capturing multivariate time-series data comprising two or more data sets from a system captured over a past time period and a present time period, applying at least two sliding time windows to the multivariate time-series data in determining respective data matrices, computing an orthonormal matrix for each of the data matrices, wherein the orthonormal matrix is a signature of fluctuation patterns of a respective data matrix, computing a difference between at least two of the data sets in the past and the present time periods through the orthonormal matrices, and detecting a fault in at least one of the systems by comparing the difference to a threshold.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

a feature extraction method based on regularized maximum likelihood of the von MisesFisher (vMF) distribution;

the feature extraction method reduced to an optimization problem called the trust-region sub-problem; and a scoring method based on a parametrized Kullback-Leibler (KL) divergence.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

Figure 1:
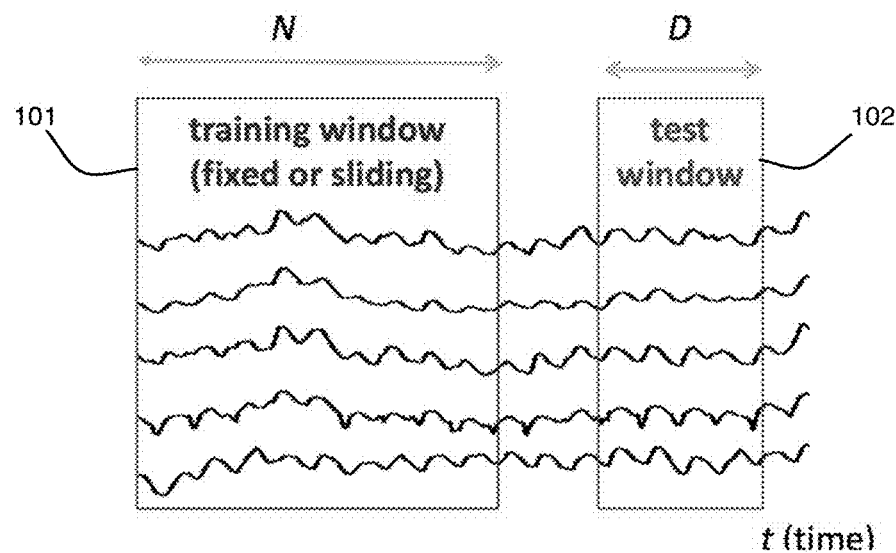
FIG. 1 depicts a change detection problem, according to an embodiment of the present invention.

For purposes of the following description, the task of change detection from noisy multivariate time-series data is described. According to an embodiment of the present invention, directional statistics are leveraged as the noise-robust signature of time-series data. According to one or more embodiments of the present invention, a regularized maximum likelihood equation for the von Mises-Fisher distribution is used to capture patterns. The regularized maximum likelihood equation simultaneously learns directional statistics and sample weights to filter out unwanted samples contaminated by the noise. In at least one exemplary embodiment, an optimization problem is reduced to the trust region sub-problem in a certain limit, where global optimality is guaranteed. According to an embodiment of the present invention, a distance measure on the Stiefel manifold is used to evaluate the amount of changes.

Embodiments of the present invention can be applied to a variety of problems and fields. Herein, an exemplary application is described for an ore mining system. It should be understood that principals of the present invention are applicable to other problems and fields.

In the context of change detection approaches having feature extraction and score calculation steps, there are two principal decision points: (1) parametric model for probability density function, and (2) scoring model for the change score. According to an embodiment of the present invention, a framework for change detection for multivariate sensor data includes a feature extraction method based on regularized maximum likelihood of the von MisesFisher (vMF) distribution, wherein the feature extraction method is reduced to an optimization problem (i.e., the trust-region subproblem), together with a scoring method based on a parametrized Kullback-Leibler (KL) divergence.

According to an embodiment of the present invention, the feature extraction method efficiently removes the multiplicative noise that is ubiquitous in many physical systems. Using an l1 regularization scheme, it is also capable of automatically removing samples contaminated by the unwanted noise.

According to an embodiment of the present invention, the trust-region sub-problem guarantees the global optimality in a certain limit, which is useful for noisy data.

According to an embodiment of the present invention, the parametrized Kullback-Leibler divergence for scoring provides a trustworthy way to quantify the discrepancy between different subspaces with different dimensionalities.

Referring now to the extracting feature matrix from noisy data; according to an exemplary embodiment of the present invention, a method of extracting feature matrix from noisy data comprises computing an orthonormal matrix as the signature of the fluctuation patterns of multivariate data and computing the difference between two data sets in the past and present through the computed orthonormal matrices.

Referring to the von Mises-Fisher distribution: Assume the case of monitoring a system with M sensors, and given N measurements $\{x^{(1)}, \ldots, x^{(N)} \in \mathbb{R}^M\}$, which may correspond to either the training window 101 or the test window 102 in FIG. 1. According to one or more embodiments of the present invention, the probabilistic model is the von MisesFisher (vMF) distribution:

$$\mathcal{M}(z \mid u, \kappa) \equiv c_M(\kappa) \exp(\kappa u^T z) \quad (1)$$

$$c_M(\kappa) \equiv \frac{\kappa^{M/2-1}}{(2\pi)^{M/2} I_{M/2-1}(\kappa)}, \quad (2)$$

where $I_{M/2-1}(\bullet)$ denotes the modified Bessel function of the first kind with the order $$\frac{M}{2} - 1.$$

The random variable z is assumed to be normalized in the sense $z^T z = 1$, where T represents transpose. The vMF distribution has two parameters: the mean direction u and the concentration parameter κ. As these names suggest, the vMF distribution describes random variability of the direction around the mean vector.

When describing the measurements using the vMF distribution, one looks only at the direction, disregarding fluctuations along the direction. This inherently gives the robustness to multiplicative noise. For example, consider an ore transfer system, where two belt conveyors are operated by the same electronic system. In this system, fluctuations in one system due to dynamic load changes are shared by the other system. In systems having strongly correlated variables, the vMF distribution is a suitable tool for system monitoring.

Referring to the weighted joint maximum likelihood: To simplify the notation, a data matrix:

$$X = [x^{(1)}, \ldots, x^{(N)}] = [b^{(1)} z^{(1)}, \ldots, b^{(N)} z^{(N)}], \quad (3)$$

is used, where $\|z^{(n)}\|_2 = 1$ and $b^{(n)} \equiv \|x^{(n)}\|_2$ for $n = 1, \ldots, N$ and $\|\bullet\|_p$ being the p-norm. The parameters of the vMF distribution may be inferred by maximizing a likelihood function:

$$L(u, w \mid X) \equiv \sum_{n=1}^{N} w^{(n)} b^{(n)} \ln \mathcal{M}(z^{(n)} \mid u, \kappa), \quad (4)$$

where w is the vector of sample weights, $w \equiv (w^{(1)}, \ldots w^{(N)})^T$. The sample weights are determined along with the other parameters from the data so that less trustworthy samples are down-weighted.

The weighted likelihood $L(u, w|X)$ has only a single pattern u, and naively maximizing $L(u, w|X)$ produces only the single direction. According to an embodiment of the present invention, to capture multiple patterns of the change, jointly fit m different distributions while keeping the overlap minimal by imposing the orthogonality between different patterns:

$$\max_{U, W} \sum_{i=1}^{m} \{L(u_i, \kappa, w_i \mid X) - R(w_i)\} \text{ s.t. } U^T U = I_m. \quad (5)$$

where $I_m$ is the m-dimensional identity matrix, $U \equiv [u_1, \ldots, u_m]$, and $W \equiv [w_1, \ldots, w_m]$. The term $R(w_i)$ is a regularizer to remove the trivial solution on the sample weights. One preferable embodiment is the elastic net regularization:

$$R(w_i) = \lambda \left( \frac{1}{2} \|w_i\|_2^2 + \nu \|w_i\|_1 \right) \quad (6)$$

where λ and ν are given constants, typically determined by cross-validation.

Figure 2:
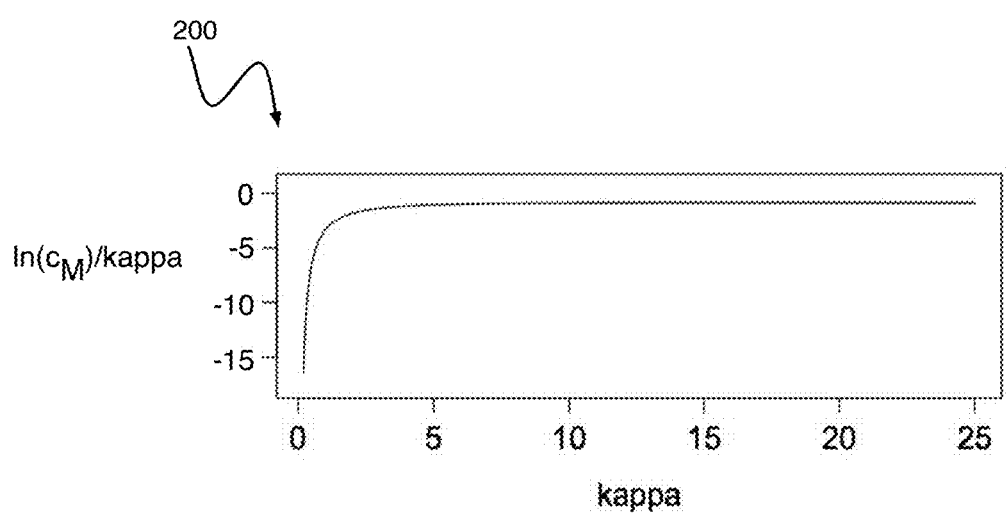
FIG. 2 depicts a graph of $\gamma/\kappa$ as a function of $\kappa(M=10)$, according to an embodiment of the present invention.

The first term of the objective function is given by $$\sum_{i=1}^{m} L(u_i, \kappa, w_i \mid X) = \kappa Tr(XWU^T) + \gamma 1^T W^T b, \quad (7)$$

where $\gamma \equiv \ln c_M(\kappa)$, $b \equiv [b^{(1)}, \ldots, b^{(N)}]^T$, and 1 is a column vector of all ones. Throughout the disclosure, treat $\kappa$ as a given constant. $\gamma/\kappa$ is insensitive to $\kappa$, as illustrated by the graph 200 in FIG. 2. One useful heuristic is to set $\kappa = M$. Otherwise, known approximation algorithms can be used.

According to one or more embodiments of the present invention, and referring to an iterative sequential algorithm, the optimization problem (5) is sequentially solved for each of $(u_i, w_i)$. Consider the example where the sample weight w is initialized to a vector. Given w, Eq. (5) is reduced to:

$$\max_u \{\kappa u^T X w\} \text{ s.t. } u^T u = 1 \tag{8}$$

for the first u. The solution is readily obtained as:

$$u = \frac{Xw}{\|Xw\|_2}. \tag{9}$$

Given this solution, the problem (5) for w is written as $$\operatorname*{argmax}_w \left\{ w^T q - \frac{\lambda}{2} w^T w - \lambda v \|w\|_1 \right\} = \operatorname*{argmin}_w \left\{ \frac{1}{2} \left\| w - \frac{q}{\lambda} \right\|_2^2 + v\|w\|_1 \right\}, \tag{10}$$

where q is defined by:

$$q \equiv \gamma b + \kappa X^T u. \tag{11}$$

This problem is a special case of LASSO regression, and has a closed-form solution as:

$$w = \operatorname{sign}(q) \odot \max\left\{ \frac{|q|}{\lambda} - v \mathbf{1}, 0 \right\}, \tag{12}$$

where $\odot$ denotes the component-wise product, 0 is the zero vector, and $|q|$ is an N-dimensional vector whose n-th entry is $|q_n|$. With this new w, Eq. (8) is solved again, wherein Eqs. (8) and (10) are alternately solved until convergence.

According to one or more embodiments of the present invention, once the first solution $(u_1, w_1)$ is obtained, again start with initialized w and solve the following problem (i.e., instead of Eq. (8)):

$$\max_u \{\kappa u^T X w\} \text{ s.t. } u^T u = 1, u_1^T u = 0. \tag{13}$$

By introducing Lagrange multipliers $\alpha$, $\beta_1$ for the two constraints, respectively, the condition of optimality is:

$$0 = \frac{\partial}{\partial u}\left[ \kappa u^T X w - \frac{\alpha}{2} u^T u - \beta_1 u^T u_1 \right] \tag{14}$$
$$= \kappa X w - \alpha u - \beta_1 u_1.$$

Using the constraints, the candidates for the solution are:

$$u \leftarrow \kappa(Xw - u_1 u_1^T Xw) \tag{15}$$

$$u \leftarrow \pm \frac{u}{\|u\|_2} \tag{16}$$

There are two stationary points, and by plugging them into the objective function in Eq. (13), an optimal solution u* is obtained. This solution is inserted into Eq. (10) to get a new w. These steps are repeated until convergence.

According to an embodiment of the present invention, the above procedure is generalized for $j = 2, \ldots, m$. According to one or more embodiments of the present invention, the method of solving the optimization problem is shown in Algorithm 1, referred to herein as the Regularized Directional feature extraction (RED) algorithm:

---
Algorithm 1 RED algorithm.

Input: Initialized w. Regularization parameters $\lambda$, $v$.
Concentration parameter $\kappa$. The number of major directional patterns m.
Output: $U = [u_1, \ldots, u_m]$ and $W = [w_1, \ldots, w_m]$.
for $j = 1, 2, \ldots, m$ do
    while no convergence do $$u_j \leftarrow \kappa[I_M - U_{j-1} U_{j-1}^T] X w_j \tag{17}$$

$$u_j \leftarrow \operatorname{sign}(u_j^T X w_j) \frac{u_j}{\|u_j\|_2} \tag{18}$$

$$q_j \leftarrow \gamma b + \kappa X^T u_j \tag{19}$$

$$w_j \leftarrow \operatorname{sign}(q_j) \odot \max\left\{ \frac{|q_j|}{\lambda} - v \mathbf{1}, 0 \right\} \tag{20}$$

end while
end for
Return U and W.

---

In Eq. (17), $U_{j-1} \equiv [u_1, \ldots, u_{j-1}]$ and $I_M$ is the M-dimensional identity matrix. The complexity of RED algorithm for each while loop iteration is $O(NM)$.

According to an embodiment of the present invention, and referring to convergence of RED algorithm, consider the following convergence theorem:

Theorem 1. Define $\tilde{X} \equiv [I_M - U_{j-1} U_{j-1}^T] X$ and $g(w_j, u_j) = \kappa u_j^T \tilde{X} w_j + \gamma w_j^T b - R(w_j)$ in the notation of Algorithm 1. The sequence $\{g(w_j^t, u_j^t)\}_{t=0, 1, \ldots}$ generated by Equations (17)-(20) of the j-th while-loop has a finite limit.

Proof. We first note that $g(w_j, u_j)$ is the objective function to be minimized for each j under the constraint $\|u_j\|_2 = 1$. The sequence $\{g(w_j^t, u_j^t)\}_{t=0, 1, \ldots}$ is bounded above since $$g(w_j, u_j) \leq \kappa u_j^T \tilde{X} w_j + \gamma w_j^T b - \frac{\lambda}{2}\|w_j\|_2^2 = \tag{21}$$

$$-\frac{\lambda}{2}\left\| w_j - \frac{\kappa \tilde{X}^T u_j + \gamma b}{\lambda} \right\|_2^2 + \frac{\|\kappa \tilde{X}^T u_j + \gamma b\|_2^2}{2\lambda}$$

$$\leq \frac{1}{2\lambda}\left\{ \|\kappa \tilde{X}^T u_j\|_2^2 + \|\gamma b\|_2^2 \right\} \leq \frac{1}{2\lambda}\{\kappa^2 \sigma_{max}(\tilde{X}\tilde{X}^T) + \|\gamma b\|_2^2\} \tag{22}$$

where $\sigma_{max}$ is the non-negative maximum eigenvalue of $\tilde{X}\tilde{X}^T$. The inequality (21) is due to $\lambda$ and $v$ being positive, the last inequality (22) is derived from $\|u_j\|_2 = 1$.

Consider further;

$$g(w_j^t, u_j^t) \leq g(w_j^t, u_j^{t+1}) \leq g(w_j^{t+1}, u_j^{t+1}),$$

where the first inequality comes from the fact that $u_j^{t+1}$ is the maximizer given $w_j^t$, and the second inequality is because $w_j^{t+1}$ is the maximizer given $u_j^{t+1}$. The boundedness and monotonically increasing of the sequence $\{g(w_j^t, u_j^t)\}_{t=0, 1, \ldots}$ complete the proof.

According to an embodiment of the present invention, and referring to a global optimality in $v \to 0$, consider the following theorem:

Theorem 2. When $v$ tends to 0, the nonconvex problem (5) is reduced to an optimization problem in the form of:

$$\min_{u}\{u^T Q u + c^T u\} \text{ s.t. } u^T u = 1, \quad (23)$$

which has a global solution obtained in polynomial time. Proof. The non-convex optimization problem (23) is known as the trust region sub-problem. Known polynomial algorithms exist for the global solution. According to an embodiment of the present invention, the algorithm is reduced to the trust region sub-problem.

When v=0, the objective function (5) leads to the optimality condition with respect to (w.r.t.) w as:

$$0 = \frac{\partial}{\partial w}\left[w^T q - \frac{\lambda}{2} w^T w\right],$$

which gives an analytic solution as $w=q/\lambda$. By inserting this solution into the objective function in Eq. (5), an optimization problem is obtained for u:

$$\max_{u}\{\kappa u^T X X^T u + 2\gamma u^T X b\} \text{ s.t. } u^T u = 1,$$

which is equivalent to Eq. (23) with $Q \equiv \kappa X X^T \in \mathbb{R}^{M \times M}$ and $c \equiv 2\gamma X b \in \mathbb{R}^{M}$.

Let $u_1$ be the solution of this problem. Once $u_1$ is obtained, again solve another trust-region sub-problem of the form (23) in the $\mathbb{R}^{M-1}$ space by adding an orthogonality condition $u_1^T u = 0$. In particular, without loss of generality, assume the last component of $u_1$ is nonzero, i.e., $u_{1,M} \neq 0$. Define $\tilde{u} \equiv (u_1, \ldots, u_{M-1})^T$ using the first M-1 dimensions of u, and a $a \equiv (u_{1,1}, \ldots, u_{1,M-1})^T/u_{1,M}$ in place of $u_1$. The problem (23) with the additional linear equality constraint is equivalent to:

$$\min_{\tilde{u}}\left\{(\tilde{u}^T, -a^T\tilde{u})Q\begin{pmatrix}\tilde{u}\\-a^T\tilde{u}\end{pmatrix} + \sum_{i=1}^{M-1} c_i u_i - c_M a^T \tilde{u}\right\} \quad (24)$$

$$\text{s.t. } \tilde{u}^T(I_{M-1} + aa^T)\tilde{u} = 1.$$

Consider the Cholesky decomposition for rank-one update:

$$I_{M-1} + aa^T = LL^T$$

and the change of variable $y \equiv L^T \tilde{u}$. The decomposition can be done efficiently. The problem (24) is rewritten as:

$$\min_{y \in \mathbb{R}^{M-1}}\{y^T \bar{Q} y + \bar{c}^T y\} \text{ s.t. } y^T y = 1$$

for a certain $(\bar{Q}, \bar{c})$, which has the same format with (23).

When more than two orthonormal vectors $u_i$ are needed, a set of linear equations is additionally considered:

$$u^T u_i = 0, i=1, \ldots, j-1.$$

According to one or more embodiments of the present invention, a variable elimination method is used in order to work on a reduced space. Note that an eigenvalue decomposition for a matrix of dimension M-j is used to transform it into a (M-j)-dimensional trust region sub-problem. In this way, a set of orthonormal vectors $\{u_1, \ldots, u_m\}$ is obtained, where m is an input parameter representing the number of major directional patterns.

Although the global optimality is no longer guaranteed when v>0, the global solution at v=0 is used to initialize w in Algorithm 1. In practice, if there is a concern about the quality of the solution, the value of v is gradually increased, and the obtained $\{w_j\}$'s are used for the next trial for a larger v. Although mathematically the RED algorithm is an iterative algorithm that may be trapped by sub-optimality, it is an "almost guaranteed" algorithm in practice.

According to one or more embodiments of the present invention, and referring to a parameterized KL divergence for scoring: Solving the optimization problem for the training and the test windows, obtain two sets of orthonormal vectors $\{u_1, \ldots, u_m\}$ and $\{v_1, \ldots, v_r\}$, where m and r are the number of vectors given as input parameters. According to one or more embodiments of the present invention, computing the change score amounts to evaluating the dissimilarity between the two vector spaces specified by orthonormal matrices:

$$U \equiv [u_1, \ldots, u_m], U^{(t)} \equiv [v_1, \ldots, v_r]. \quad (26)$$

Now the problem is to compute the dissimilarity on a Stiefel manifold, which is the space spanned by orthogonal matrices.

According to an exemplary embodiment of the present invention, as illustrated in FIG. 1, in practice, the window size of test window D 102 is chosen (e.g., as small as possible) to minimize the time lag in change detection, while the number of samples training window N 101 in the training data is large enough to ensure capture of the (major) patterns. Depending on the nature of data, it can be assumed that m≠r.

According to an exemplary embodiment of the present invention, to handle this general situation, consider linear combinations of $u_i$'s and $v_i$'s and define the change score as a parameterized version of KL divergence:

$$a^T = \min_{f,g} \int dx \mathcal{M}(x | Uf, \kappa) \ln \frac{\mathcal{M}(x | Uf, \kappa)}{\mathcal{M}(x | U^{(t)}g, \kappa)} \quad (27)$$

under the constraint of $f^T f = 1$, $g^T g = 1$. This can be also viewed as an averaged version of the log likelihood ratio, which is a standard measure of change detection.

According to an exemplary embodiment of the present invention, by inserting the definition of the vMF distribution in Eq. (1):

$$a^T = \kappa \min_{f,g} \int \{\langle x \rangle^T (Uf - U^{(t)}g)\}, \quad (28)$$

where $\langle \cdot \rangle$ is the expectation w.r.t. $\mathcal{M}(x|Uf,\kappa)$. Since $\langle x \rangle \propto Uf$ follows from the basic property of the vMF distribution:

$$a^{(t)} = 1 - \max_{f,g}\{f^T U^T U^{(t)} g\} \text{ s.t. } f^T f = 1, g^T g = 1, \quad (29)$$

where a prefactor has been dropped.

According to an exemplary embodiment of the present invention, the optimization problem (29) is solved. Introducing Lagrange multipliers $\pi_1$, $\pi_2$ for the two constraints, obtain optimality conditions as:

$$U^T U^{(t)} g = \pi_1 f, U^{(t)T} U f = \pi_2 g.$$

This means that f and g are found via singular-value decomposition of $U^T U^{(t)}$, which is a small matrix of size m×r. The maximum of the objective function is given by the maximum singular value, $\sigma_1^{(t)}$; thereby the final formula is reached for the change score:

$$a^{(t)} = 1 - \sigma_1^{(t)}. \tag{30}$$

According to an exemplary embodiment of the present invention, the maximum singular vector is computed by the well-known power method or power iteration, or more generally an eigenvalue algorithm. In most practical situations, iterations are limited to about as many as min{m, r}. The complexity to compute the KL-based change score is $(\min\{m,r\})^3$. Since m and r are small in most applications, it is negligible in practice.

Referring now to experimental results, a method denoted by RED+KL, which is implemented in accordance with embodiments of the present invention, and which uses Algorithm 1 for computing U and $U^{(t)}$ in Eqs. (26) and (30) for the change score, is compared with the following alternative methods:

RED+tr: Use Algorithm 1 for U but replace Eq. (30) with the trace norm where r=m:

$$a^{(t)} = 1 - \frac{1}{m} Tr(U^T U^{(t)}). \tag{31}$$

SSA: Use SSA for U. First identify the most stationary subspace by solving $$\min_{V^T V = I_{M-m}} \sum_{i=1}^{E} \left\{ -\ln \left| V^T \sum_i V \right| + \| V^T \mu_i \|^2 \right\}, \tag{32}$$

where E is the number of epochs defined by a non-overlapping time window of size D, and $\{\mu_i, \Sigma_i\}$ are the sample mean and covariance matrix computed in the i-th epoch. |•| represents the determinant in this case. Once V is found, U is obtained as the complement space of V. The change score is computed by:

$$a^{(t)} = -\ln |U^T \Sigma^{(t)} U| + \| U^T \mu^{(t)} \|^2 + Tr(U^T \Sigma^{(t)} U),$$

where $\mu^{(t)}$ and $\Sigma^{(t)}$ are the mean and the covariance matrix over $\mathcal{Z}^{(t)}$, which is defined as the set of the samples in the sliding window at time t. Before computing these, the data is whitened with the same pooled mean and covariance of the training data.

PCA: Use the principal component analysis for U. Employ the mean reconstruction error for scoring:

$$a^{(t)} = \frac{1}{D} \sum \| (I_m - UU^T) x^{(n)} \|^2. \tag{33}$$

T2: Use the mean Hotelling's $T^2$ statistic:

$$a^{(t)} = \frac{1}{D} \sum (x^{(n)} - \mu)^T \Sigma^{-1} (x^{(n)} - \mu). \tag{34}$$

for scoring. Here $\mu$ and $\Sigma$ are the mean and the covariance matrix of the training data. T2 is compared only in change detection since it has no explicit feature extraction step.

Figure 3:
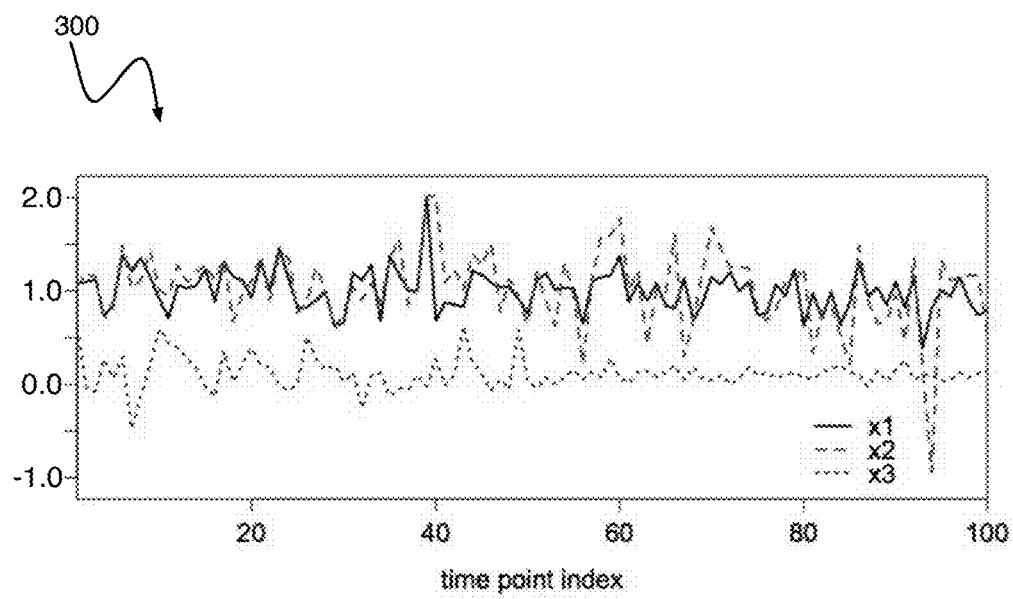
FIG. 3 depicts synthetic three-dimensional time-series data according to an embodiment of the present invention.

Given these alternative feature extraction methods, synthetic data is used in the comparison. FIG. 3 shows exemplary three-dimensional synthetic time-series data 300. In this data, $x_1$ and $x_2$ are noisy, but significantly correlated, while $x_3$ is uncorrelated to the others. Thus, the principal direction would point is expected to be the 45° line between $x_1$ and $x_2$.

Figure 4:
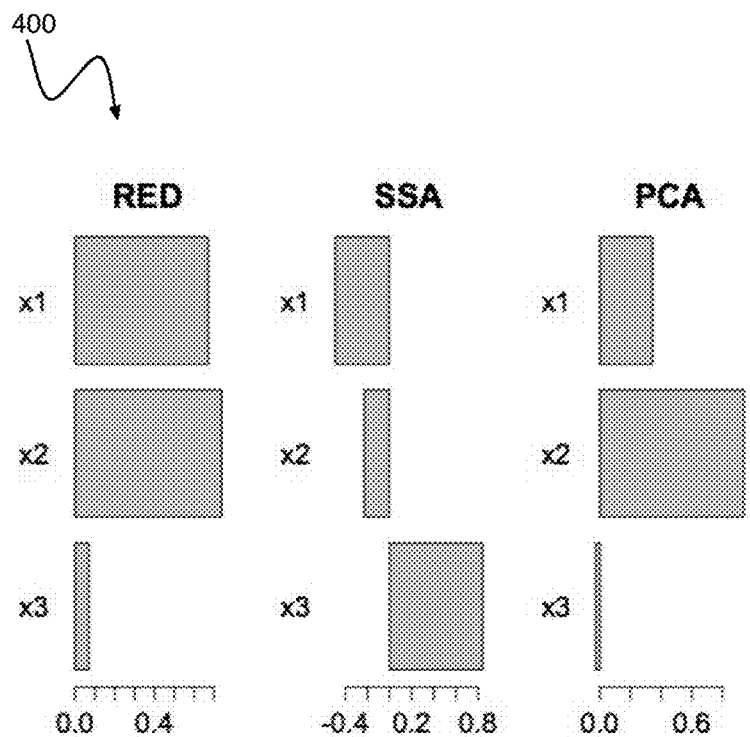
FIG. 4 depicts a comparison of $u_1$ (synthetic data), according to an embodiment of the present invention.

Compared a method implemented according to one or more embodiments of the present invention (denoted by RED), with two alternatives SSA and PCA, all methods take the data matrix X as the input, and return an orthonormal matrix U as the output. FIG. 4 shows the coefficients 400 of the first component $u_1$. For RED, $(\lambda, v) = (1, 4)$ are used, while for SSA D=25 is used.

RED successfully captures the expected 45° direction as the principal direction. PCA has a similar trend, but due to the major outlier in $x_2$ at 94 (see FIG. 3), it has more weight in $x_2$. Close inspection shows that RED automatically removes this outlier by putting zero weight, demonstrating the automated noise-filtering capability.

The basic assumption of SSA is that the stationary components are most likely noise, and the non-stationary components are more informative for change detection. In this particular example, the major pattern is the correlation structure between $x_1$ and $x_2$, and the other variable $x_3$ is the noise. However, due to the heavy noise especially in the first half of $x_3$, SSA fails to disregard the noise variable.

Figure 5:
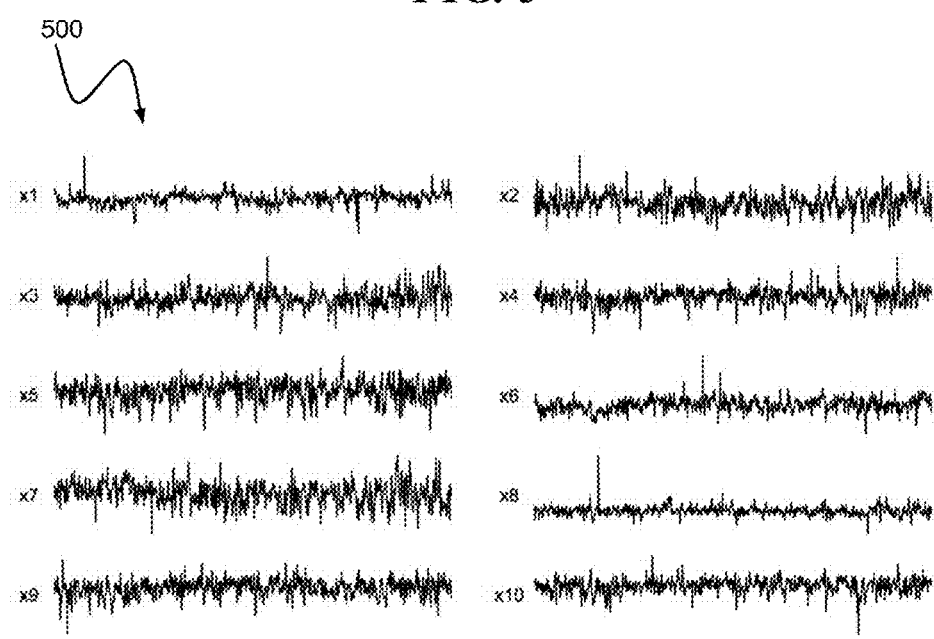
FIG. 5 depicts ore transfer data under a normal operation, according to an embodiment of the present invention.

According to an exemplary embodiment of the present invention, in the case of real-world data, a comparison of on-line change detection performance is examined. Applying the RED method to a real-world on-line change detection task, FIG. 5 shows time-series data 500 from an ore transfer system being monitored by ten sensors measuring physical quantities such as speed, current, load, temperature, and displacement. The data itself is generated by a testbed system to simulate a normal operating condition and is used as the training data. The system includes sets of two almost equivalent subsystems, and some of the variables are significantly correlated, and incur the multiplicative noise. As seen, the data is noisy and sometimes exhibits impulse-like noise due to the physical operating condition of the outdoor ore transfer system.

Figure 6:
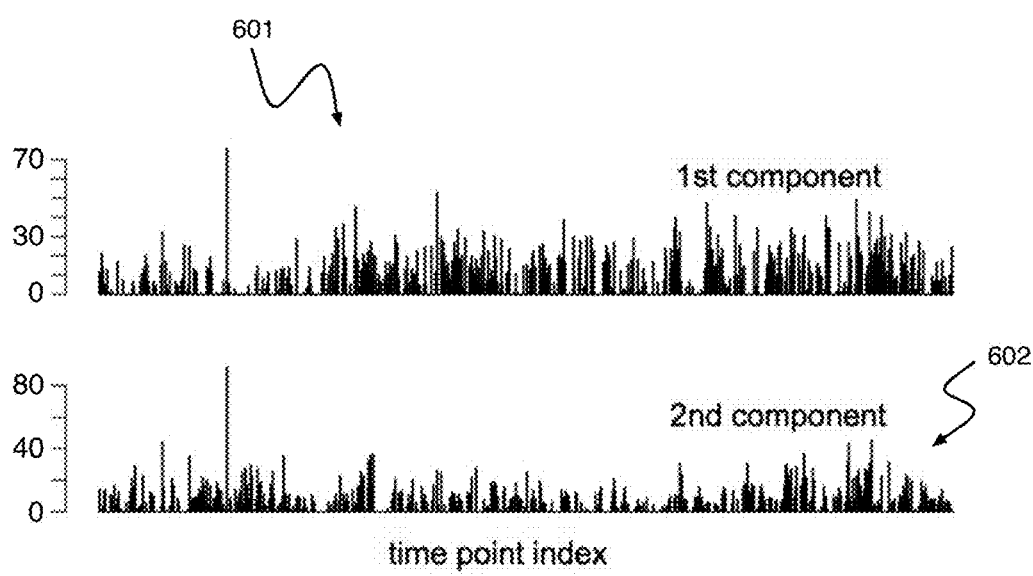
FIG. 6 depicts the magnitude of the sample weights $\{w_i^{(m)}\}$ for the first and second components (when aligned with FIG. 5), according to an embodiment of the present invention.

For this training data, applying the RED algorithm to find U and W, FIG. 6 shows $W = [w_1, w_2]$, where $(\lambda, v) = (2, 9)$ is used, that maximized the F score for the test data. It can be seen that many samples are driven to zero. In fact, 43 and 39 percent of the samples have exactly zero in $w_1$ (601) and $w_2$ (602), respectively, out of which about 16 percent are zero in both. Close inspections show that almost all of "out-of-context" outliers are cut off, while informative outliers that are consistent to the major correlation structure survive.

Figure 7:
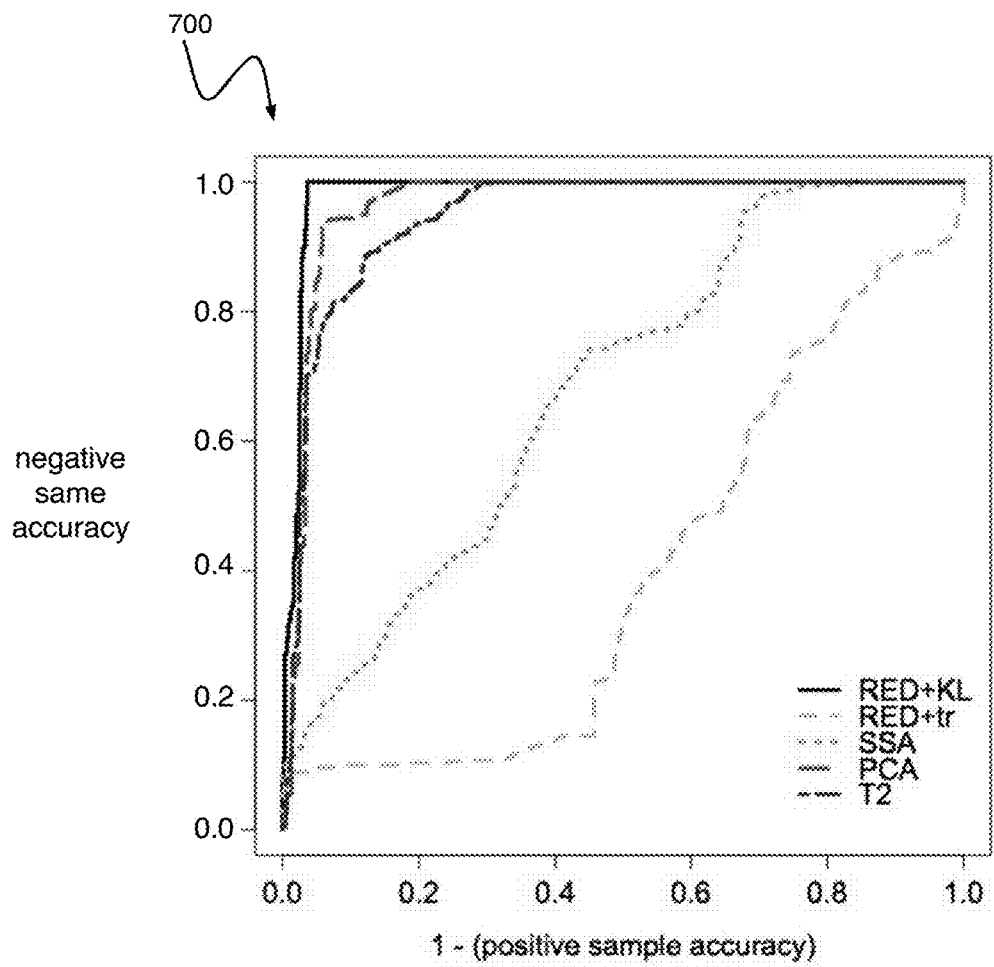
FIG. 7 depicts a comparison of the ROC curve, according to an embodiment of the present invention.

The performance of on-line change detection evaluated using another data set, where changes due to system malfunctions are recorded, many of the failure symptoms are associated with unreasonable changes in the correlation structure between the variables. Using the negative-sample and positive-sample accuracies as the performance metric, the negative samples are defined by those not belonging to change-points, while the positive samples are those belonging to change-points. Using the harmonic average (F score) of them to determine the $(\lambda, v)$ values. A window of D=60 is used over about 1200 samples. FIG. 7 compares the ROC (Receiver Operating Characteristic) curve. As can be seen at 700, RED-KL with (m, r)=(2, 3) outperforms the alternatives, where RED-tr gives the worst performance, demonstrating the importance the subspace comparison technique of Eq. (30). For this data set, SSA fails to capture change points (SSA is not necessarily robust to spiky outliers as seen in FIG. 5). Since the correlational structure is important to detect change points in this data, it makes sense that the PCA and T2 do a good job.

According to one or more embodiments of the present invention, an on-line change detection algorithm for multi-variate time-series data extracts major directional patterns while automatically disregarding less informative samples. The convergence of implementations of the on-line change detection algorithm have been proved, wherein the quality of the solution is supported by the global optimality of the trust-region sub-problem. According to one or more embodiments of the present invention, a method of scoring the change based on a parameterized KL divergence is disclosed.

Recapitulation

According to an embodiment of the present invention, a method for extracting feature matrix (see method 800, FIG. 8) from noisy data includes capturing multivariate time-series data comprising two or more data sets from respective systems (801). For example, an exemplary system can include two or more dumper cars (or apron feeders) operating in a mining operation. These dumper cars are monitored by sensors. The sensors monitor physical quantities such as vibration or acceleration, speed, strain, temperature, pressure, voltage, etc., and sometimes machine-specific state variables such as throttle position, gear number, power on/off, etc. According to an exemplary embodiment of the present invention, an orthonormal matrix is computed as the signature of the fluctuation patterns of the multivariate data 802 and the difference between two or more data sets in the past and present through the computed orthonormal matrices is computed 803. A fault in at least one of the systems is upon comparing the difference to a threshold 804, upon which the changing system can be removed from service and inspected 805. For example, in the example of the mining operation, bearing wear can be detected (e.g., if the computed difference is greater than 20%) before failure of the dumper car.

Figure 8:
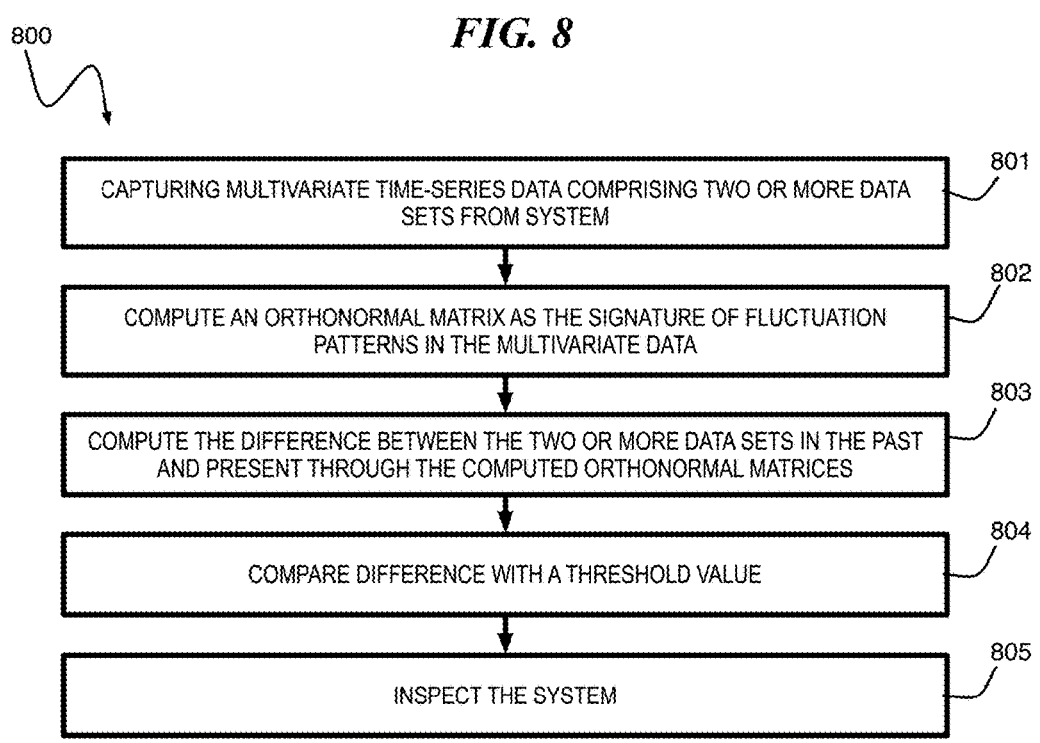
FIG. 8 is a flow diagram of a method for change detection from noisy multivariate time-series data, according to an embodiment of the present invention

In the context of an exemplary implementation (e.g., an apron feeder system), FIG. 8 describes an overall procedure for change detection according to one or more embodiments of the present invention. In this example, the apron feeder system (such as one used in an ore mining site) is monitored with one or more sensors, such as those monitoring motor current, conveyor speed, load, displacement, etc. Those sensors acquire data at a certain time interval, such as one minute.

In the scenario of near real-time change detection, two sliding windows along the time axis are defined to provide two data matrices (801). One window, which is called the test window, covers a predefined time duration up to the present time. If, for example, the system is monitored with ten sensors, the time interval of measurement is one minute, and the window size is three days, this window defines a 10×4320 data matrix. The other window, which is called the training window, is placed on the past side of the test window. It covers, for example, one month up to the starting point of the test window. The training window defines another data matrix.

Based on the data matrices, orthogonal matrices as the signatures of the present and past states of the system are computed using Algorithm 1 (802).

For the orthogonal matrices, the change score is computed preferably by Eq. (30), which corresponds to the distance between the two orthogonal matrices (803). Other distance metrics such as Eq. (31) can be used as well.

The computed change score is compared with a predefined threshold (804). If the score is greater than the threshold, an action to fix the problem (805), for example, by a system administrator.

According to one or more embodiments of the present invention, by repeatedly performing the procedure illustrated in FIG. 8 at a predefined time interval, every 30 minutes for example, near real-time change detection is achieved. In an exemplary system including a number of subsystems, the procedure can be performed separately for each subsystem.

According to an embodiment of the present invention, a method for extracting feature matrix (see method 900, FIG. 9) from noisy multivariate time-series data includes receiving comprises initializing a weight w, regularization patterns $\lambda$, $\upsilon$, a concentration parameter $\kappa$ and the number of directional patterns m 901. For each directional pattern (i.e., j=1, 2, . . . , m) 902, obtain an optimal pattern u* 904, obtain vector q (see Eq. (19)) using the optimal pattern 905, obtain a new sample weight w for u* using q 906, and test for convergence 907. The method outputs a set of optimal patterns and corresponding weights 903.

Figure 9:
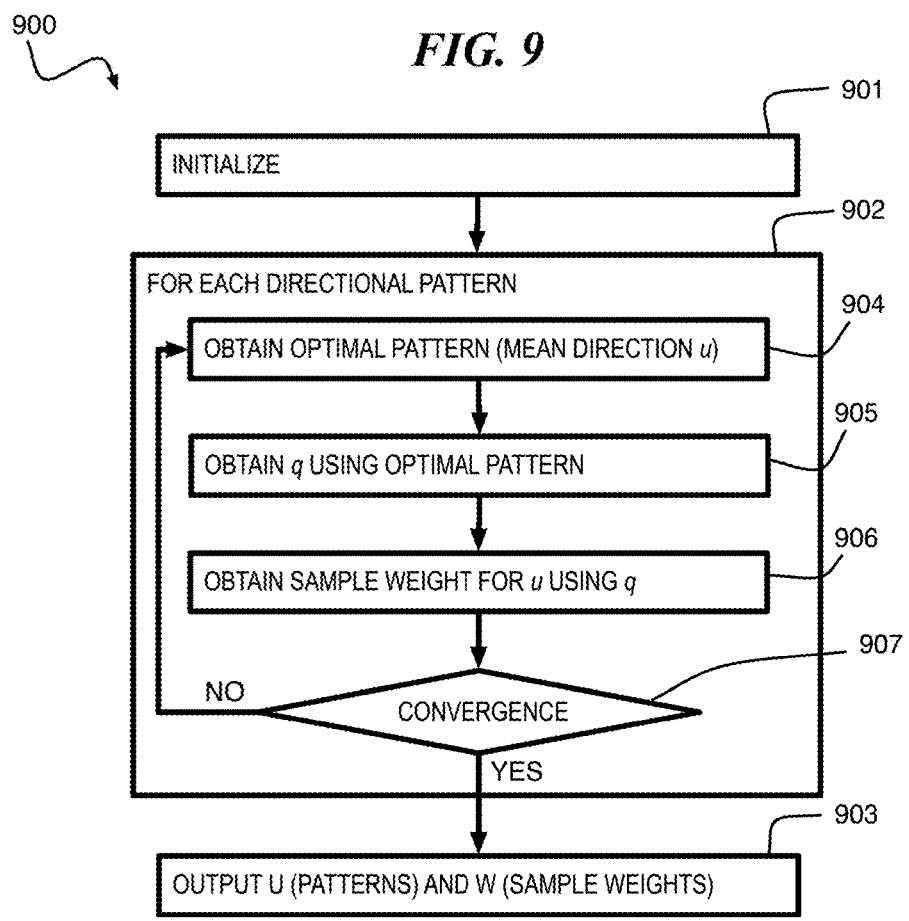
FIG. 9 is a flow diagram correspond to Algorithm 1, according to an embodiment of the present invention.

According to an embodiment of the present invention, FIG. 9 illustrates a method for generating an orthogonal matrix as the signature of the dynamics of the system. The orthogonal matrix is created by generating a predefined number of directional vectors $u_1$, $u_2$, . . . and placing them as the column vector of a matrix.

A data matrix, X, and a weight vector, w, are provided at 901. The data matrix is typically created with the sliding window applied to multivariate time-series data. For example, if 500 time points are clipped by the sliding window from the data of a system being monitored using 10 sensors, the data matrix is a 10×500 matrix, and the weight vector is a 500-dimensional vector. The weight vector can be initialized by giving 1 to all the entries, if there is no specific reason no to do so.

The method further comprises computing the first directional vector, $u_1$, using Eqs. (17) and (18) 904, computing the q vector using Eq. (19) 905 and computing the first weight vector, $w_1$, using Eq. (20) 906.

These three steps are repeated until convergence 903. Using the new $w_1$, the first directional vector $u_1$ is updated by Eqs. (17) and (18). Using the newly updated $u_1$, the first weight vector $w_1$ is updated with Eqs. (19) and (20). Every time ($u_1$, $w_1$) is updated, convergence is checked.

Once ($u_1$, $w_1$) converges, the procedure moves on to the second directional vector and weight vector ($u_2$, $w_2$). In this step, $u_1$ is used to define $U_{j-1}$ in Eq. (17). Similarly, to find ($u_j$, $w_j$), $u_1$, $u_2$, . . . , $u_{j-1}$ are used to define $U_{j-1}$.

The steps 904-907 are repeated until a predefined number of the directional vectors and the weight vectors are found. 903

Elements of one or more embodiments of the invention can be implemented, at least in part, in the form of an apparatus including a memory and at least one processor that is coupled to the memory and operative to perform exemplary method steps.

Figure 10:
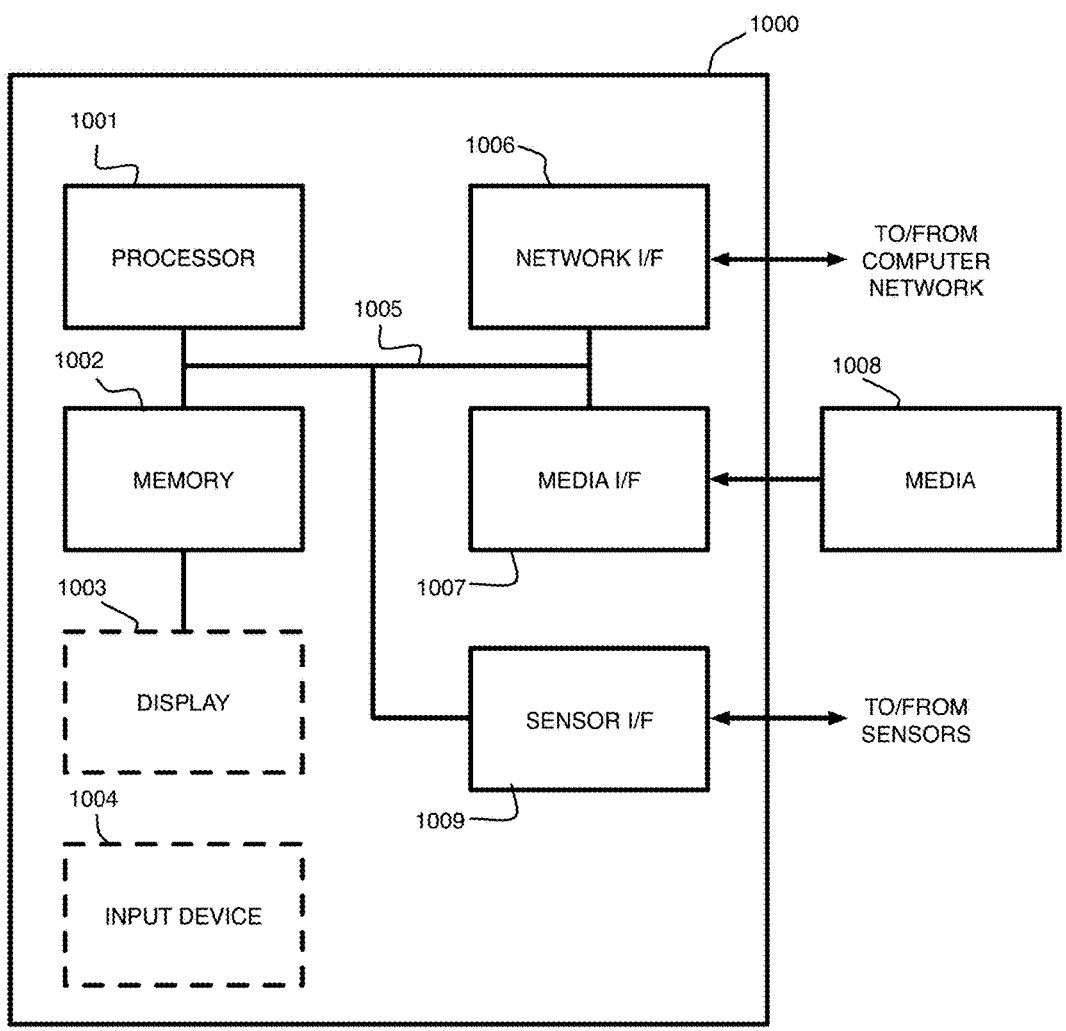
FIG. 10 is a block diagram depicting an exemplary computer system embodying a a method for change detection from noisy multivariate time-series data, according to an exemplary embodiment of the present invention.

One or more embodiments can make use of software running on a general purpose computer or workstation (e.g., to implement steps 801-805 and/or 901-903 and/or to carry out an on-line change detection for multivariate time-series data). With reference to FIG. 10, such an implementation might employ, for example, a processor 1001, a memory 1002, and an input/output interface formed, for example, by a display 1003 and an input device 1004 (e.g., keyboard). The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1001, memory 1002, and input/output interface such as display 1003 and input device 1004 can be interconnected, for example, via bus 1005 as part of a data processing unit 1000. Suitable interconnections, for example via bus 1005, can also be provided to a network interface 1006, such as a network card, which can be provided to interface with a computer network; to a media interface 1007, such as a diskette or CD-ROM drive, which can be provided to interface with media 1008; and/or to a sensor interface 1009, such as analog-to-digital converter(s) or the like, which can be provided to interface with sensors or items to be controlled; e.g., the references, antenna elements, phase shifters, amps, etc.

Interfaces 1006, 1007 and 1009 are generally representative of a variety of techniques for communicating with and controlling the various elements discussed herein. For example, processor 1001 can communicate with the sensors, antenna elements, etc. over a wired or wireless computer network or directly with cabling.

A suitable optimization module may be stored in persistent memory and loaded into volatile memory to configure processor 1001 to carry out the techniques described herein.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1001 coupled directly or indirectly to memory elements 1002 through a system bus 1005. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards, displays, pointing devices, and the like) can be coupled to the system either directly (such as via bus 1005) or through intervening I/O controllers (omitted for clarity).

Network adapters such as network interface 1005 may also be coupled to the system to enable the data processing system to become coupled to other data processing systems or remote printers or storage devices through intervening private or public networks. Modems, cable modem and Ethernet cards are just a few of the currently available types of network adapters. In one or more embodiments, network interface 1006 and/or sensor interface 1009 collect data and also send control signals.

Computer-human interfaces can be provided using, for example, a suitable graphical user interface (GUI) wherein a server serves html out to a browser on a user's client machine. Interfaces between software and/or hardware elements can employ hard-wired connections, networks, database programs to retrieve parameters from persistent storage, application programming interfaces (APIs), shared data structures, and the like.

As used herein, including the claims, a "server" includes a physical data processing system (for example, system 1000 as shown in FIG. 10) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 1002. Further, a computer program product can include a computer-readable storage medium with code adapted to be implemented to carry out one or more method steps described herein, including the provision of the system with the distinct software modules.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    capturing multivariate time-series data comprising two or more data sets from a system captured over a past time period and a present time period;
    applying at least two sliding time windows to the multivariate time-series data in determining respective data matrices;
    computing an orthonormal matrix for each of the data matrices, wherein the orthonormal matrix is a signature of fluctuation patterns of a respective data matrix;
    computing a difference between at least two of the data sets in the past and the present time periods through the orthonormal matrices;
    detecting a fault in at least one of the systems by comparing the difference to a threshold and removing the system from service upon detected the fault.

2. The method of claim 1, wherein the multivariate time-series data is captured by a plurality of sensors.

3. The method of claim 2, further comprising measure, by the plurality of sensors, one or more of acceleration, speed, strain, temperature, pressure, and voltage.

4. The method of claim 2, further comprising measure, by the plurality of sensors, one or more of throttle position, gear number, and power status.

5. The method of claim 1, wherein a first sliding time window of the two sliding time windows is a test window covering a predefined time duration up to the present time period, and wherein a second sliding time window of the two sliding time windows is a training window covering a portion of the past time period.

6. The method of claim 1, wherein computing the difference comprising determining a change score corresponding to a distance between the orthonormal matrices.

7. The method of claim 1, wherein the steps of capturing multivariate time-series data, applying the at least two sliding time windows to the multivariate time-series data in determining respective data matrices, computing the orthonormal matrix for each of the data matrices, and computing the difference between at least two of the data sets are iteratively repeated until the detection of the fault.

8. The method of claim 1, further comprising performing the steps of capturing multivariate time-series data, applying the at least two sliding time windows to the multivariate time-series data in determining respective data matrices, computing the orthonormal matrix for each of the data matrices, and computing the difference between at least two of the data sets for at least one sub-system of the system.

9. A non-transitory computer readable medium comprising computer executable instructions which when executed by a computer cause the computer to perform a method comprising:

capturing multivariate time-series data comprising two or more data sets from a system captured over a past time period and a present time period;

applying at least two sliding time windows to the multivariate time-series data in determining respective data matrices;

computing an orthonormal matrix for each of the data matrices, wherein the orthonormal matrix is a signature of fluctuation patterns of a respective data matrix;

computing a difference between at least two of the data sets in the past and the present time periods through the orthonormal matrices;

detecting a fault in at least one of the systems by comparing the difference to a threshold and removing the system from service upon detected the fault.

10. The computer readable medium of claim 9, wherein the multivariate time-series data is captured by a plurality of sensors.

11. The computer readable medium of claim 10, further comprising measure, by the plurality of sensors, one or more of acceleration, speed, strain, temperature, pressure, and voltage.

12. The computer readable medium of claim 10, further comprising measure, by the plurality of sensors, one or more of throttle position, gear number, and power status.

13. The computer readable medium of claim 9, wherein a first sliding time window of the two sliding time windows is a test window covering a predefined time duration up to the present time period, and wherein a second sliding time window of the two sliding time windows is a training window covering a portion of the past time period.

14. The computer readable medium of claim 9, wherein computing the difference comprising determining a change score corresponding to a distance between the orthonormal matrices.

15. The computer readable medium of claim 9, wherein the steps of capturing multivariate time-series data, applying the at least two sliding time windows to the multivariate time-series data in determining respective data matrices, computing the orthonormal matrix for each of the data matrices, and computing the difference between at least two of the data sets are iteratively repeated until the detection of the fault.

16. The computer readable medium of claim 9, further comprising performing the steps of capturing multivariate time-series data, applying the at least two sliding time windows to the multivariate time-series data in determining respective data matrices, computing the orthonormal matrix for each of the data matrices, and computing the difference between at least two of the data sets for at least one sub-system of the system.

* * * * *